US009734108B2

(12) United States Patent
Shahoian et al.

(10) Patent No.: US 9,734,108 B2
(45) Date of Patent: Aug. 15, 2017

(54) UNIVERSAL CONNECTOR

(75) Inventors: Erik J. Shahoian, Sonoma, CA (US); Gregory A. Springer, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 845 days.

(21) Appl. No.: 13/455,115

(22) Filed: Apr. 24, 2012

(65) Prior Publication Data

US 2012/0270419 A1    Oct. 25, 2012

Related U.S. Application Data

(60) Provisional application No. 61/478,805, filed on Apr. 25, 2011.

(51) Int. Cl.
*G06F 13/40* (2006.01)
*H01R 24/60* (2011.01)
*H01R 13/66* (2006.01)
*H01R 13/6471* (2011.01)
*H01R 107/00* (2006.01)

(52) U.S. Cl.
CPC ..... *G06F 13/4068* (2013.01); *H01R 13/6471* (2013.01); *H01R 13/6658* (2013.01); *H01R 24/60* (2013.01); *H01R 2107/00* (2013.01)

(58) Field of Classification Search
CPC .................................................. G06F 13/4068
USPC ...................................................... 307/155
See application file for complete search history.

(56) References Cited

U.S. PATENT DOCUMENTS

| 5,333,177 | A | * | 7/1994 | Braitberg | ............. H02J 7/0004 379/441 |
| 2003/0041284 | A1 | * | 2/2003 | Mambakkam | ...... G06F 11/1435 714/15 |
| 2008/0071940 | A1 | | 3/2008 | Kim et al. | |
| 2008/0085013 | A1 | * | 4/2008 | Somasundaram | ..... H03G 5/005 381/95 |
| 2008/0276015 | A1 | | 11/2008 | Kim et al. | |

FOREIGN PATENT DOCUMENTS

| CN | 201218931 Y | 4/2009 |
| DE | 10 2007 035 044 A1 | 1/2008 |
| KR | 10-2010-0101677 A | 9/2010 |
| TW | 200924301 | 6/2009 |
| WO | 2009/085494 A1 | 7/2009 |

OTHER PUBLICATIONS

International Search Report dated Oct. 8, 2012, from PCT Patent Application No. PCT/US2012/34822, 54 pages.

(Continued)

*Primary Examiner* — Thienvu Tran
*Assistant Examiner* — David M Stables
(74) *Attorney, Agent, or Firm* — Kilpatrick Townsend & Stockton, LLP

(57) ABSTRACT

Circuits, methods, and apparatus that limit the number of types of connectors needed by an electronic device. One example may provide a connector receptacle capable of adapting to multiple types of connector inserts. In this way, connector inserts conveying one of a number of interfaces can be accepted by the same connector receptacle. This may reduce the number and types of connector receptacles needed on an electronic device.

19 Claims, 12 Drawing Sheets

(56) References Cited

OTHER PUBLICATIONS

Korean Office Action mailed on Nov. 12, 2014 for KR Patent Application No. 10-2013-7030838, with English Translation, 8 pages.
Chinese Office Action mailed on Jun. 1, 2015 for CN Patent Application No. 201280020202.1, with English translation, 25 pages.
European Office Action dated Mar. 22, 2016 for European Application No. 12 718 845.6, 4 pages.
Chinese Office Action Jan. 18, 2016, for Chinese Application No. 201280020202.1, 20 pages.
Notice of Allowance, Taiwan Patent Application No. 101114573, dated Nov. 27, 2015, 7 pages.

* cited by examiner

UNIVERSAL CONNECTOR

CROSS-REFERENCES TO RELATED APPLICATIONS

This application claims the benefit of U.S. provisional patent application No. 61/478,805, filed Apr. 25, 2011, which is incorporated by reference.

BACKGROUND

The number of types of electronic devices that are commercially available has increased tremendously the past few years, and the rate of introduction of these devices shows no signs of abating. Devices, such as tablet, laptop, netbook, desktop, and all-in-one computers, cell, smart, and media phones, storage devices, portable media players, navigation systems, monitors, and others, have become ubiquitous.

Often, these devices communicate with other devices. As just one example, a desktop computer may need to communicate with a monitor or display device. Such communications may take place over a cable. The cable may have connector inserts on each end, where the connector inserts mate with connector receptacles on the desktop and the monitor.

Currently, electronic devices may include many connector receptacles. For example, a laptop computer may have connectors for Universal Serial Bus (USB), a High-Definition Multimedia Interface (HDMI), Digital Visual Interface (DVI), power, Ethernet, DisplayPort, Thunderbolt, and other types of interfaces.

Such diversity is not without its downside. The inclusion of so many connectors consumes space inside the electronic device, as well as the surface area of its outer case. This means that smaller devices may only be able to include a limited number of connectors. Customer confusion may also result as users try to sort through a bewildering array of acronyms. Design complexity may also be increased. For example, to avoid damage, each new connector may be constructed such that a connector insert from a cable that supports one interface cannot be improperly inserted into a connector receptacle for another interface.

Also, as these standards and interfaces evolve, devices with newer connectors may not be compatible with a user's legacy components. For example, a new computer may have an HDMI connector, while a monitor may have a DVI connector. An adapter to convert signals from HDMI to DVI may be used, but such necessity invokes further customer dissatisfaction.

Thus, what is needed are circuits, methods, and apparatus that limit the number of types of connector receptacles needed by an electronic device.

SUMMARY

Accordingly, embodiments of the present invention may provide circuits, methods, and apparatus that may limit the number of types of connectors needed by an electronic device. An embodiment of the present invention may provide a connector receptacle capable of adapting to multiple types of connector inserts. In this way, connector inserts conveying one of a number of interfaces may be accepted by the same connector receptacle. This may reduce the number and types of connector receptacles needed on an electronic device.

In an exemplary embodiment of the present invention, a connector receptacle may have a number of relatively small pads or contacts arranged in an array or other pattern. These pads or contacts may be on a top, bottom, or both a top and bottom surface of the receptacle. Still other pads or contacts may be placed on sides of the receptacle. Each pad or contact may be configured to be connected to a power, ground, or signal line. When a connector insert is engaged with the connector receptacle, the connector receptacle may determine, for each connector receptacle pad, whether the pad has formed an electrical connection with a relatively larger connector insert contact.

In an exemplary embodiment of the present invention, a connector receptacle includes a number of pads or contacts arranged in an array. Each horizontal line of pads may receive one of a first set of signals, where each signal in the first set of signals has a different frequency. Similarly, each vertical line of pads may receive one of a second set of signals, where each signal in the second set of signals has a different frequency. In this way, each pad has a unique set of two frequencies. Each pad can then be analyzed to determine which frequencies appear at that pad. From this, it may be determined which receptacle pads are connected together through an insert pad. In other embodiments of the present invention, other patters of receptacle contacts or pads may be used, and these signals may be applied in various ways.

In another exemplary embodiment of the present invention, a connector receptacle includes a number of pads or contacts arranged in an array. A signal may be applied to a first pad. Pads that are nearby may be checked for the presence of the signal. Receptacle pads where the signal is present may be identified as being connected together through an insert pad.

In an exemplary embodiment of the present invention, once it is determined which receptacle pads are shorted by insert pads, the identity of the connector insert may be determined. For example, each insert may have a unique pad arrangement which identifies the connector insert as being a connection for a specific interface, such as a USB, HDMI, DVI, power, Ethernet, DisplayPort, Thunderbolt, or other type of interface. In a specific embodiment of the present invention, each of a number of connector inserts may have a similar pad pattern, with one or more pads omitted, where the omissions indicate the type of connector insert.

In another exemplary embodiment of the present invention, the type of connector insert is determined before the connections among the receptacle pads are determined. In a specific embodiment of the present invention, the type of connector insert may be indentified by determining that a unique pattern of a subset of the receptacle pads are connected together through an insert pad. Once this occurs, the remaining connections can be determined.

In another embodiment of the present invention, once the identity of a connector insert is determined, the validity of that determination may be checked. This reduces the possibility that an improperly made connector insert may cause damage to a connector receptacle. This validity may be achieved by using handshaking signals or by other techniques.

In various embodiments of the present invention, the connector insert may be registered with the connector receptacle when inserted, while in other embodiments of the present invention, the connector insert is not registered, and may instead move relative to the connector receptacle even after insertion. By updating the connector receptacle pad connection information, a proper connection between insert and receptacle may be maintained even as the insert moves relative to the receptacle.

In various embodiments of the present invention, the connector insert may be non-binding, that is, it may be shaped so that it may be removed using a non-axial force. In still other embodiments, the connector insert may be thin. In this way electronic device thickness is not limited. Also, in various embodiments of the present invention, a self-wiping feature may be included.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
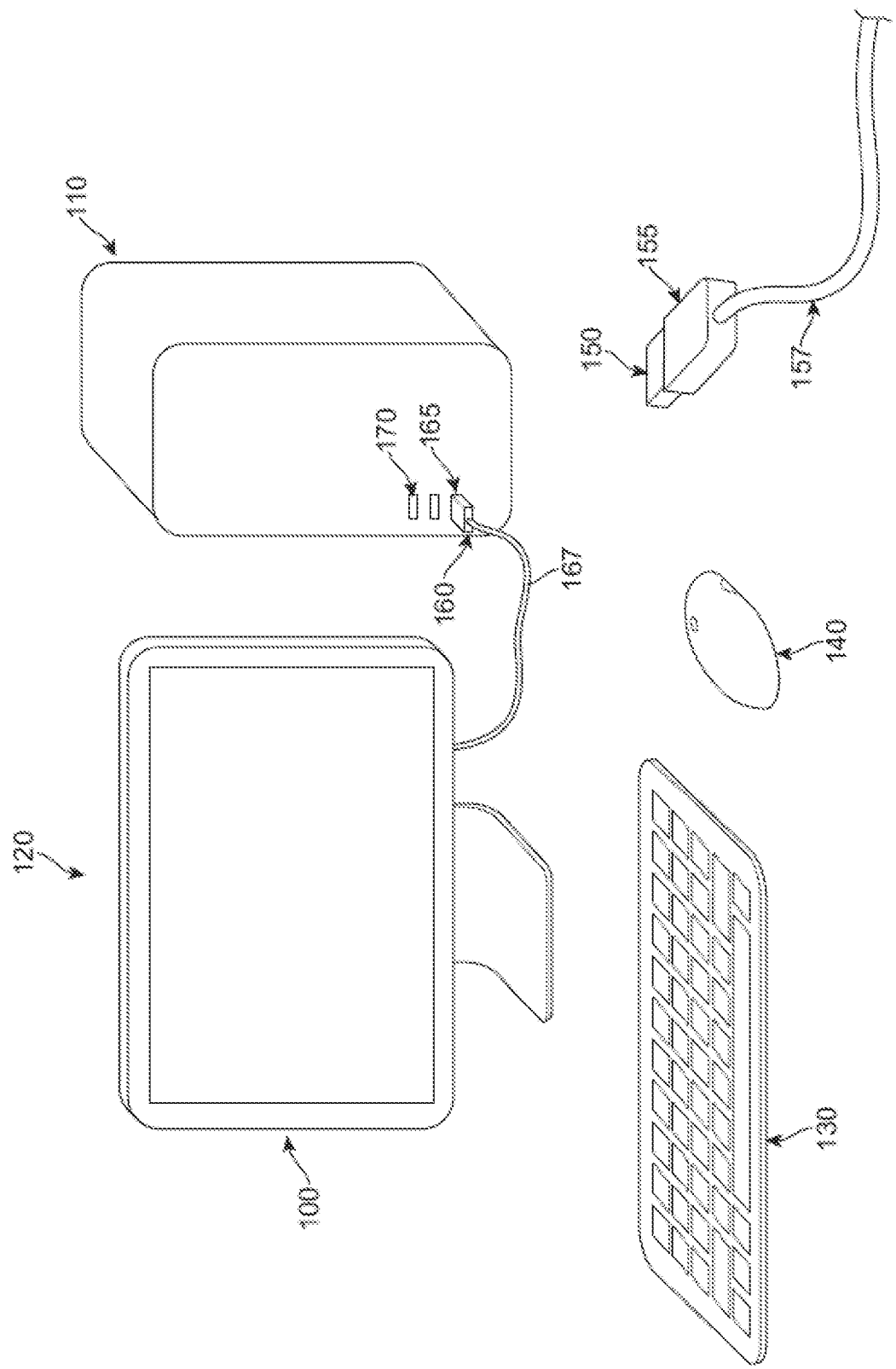
FIG. 1 illustrates a computer system that may be improved by the incorporation of embodiments of the present invention.

FIG. 1 illustrates a computer system 100 that may be improved by the incorporation of embodiments of the present invention. This computer system 100 may include desktop computer 110, monitor 120, keyboard 130, and mouse 140. In this example, desktop computer 110 may drive monitor 120 with signals provided over cable 167. Cable 167 may include connector insert 160, which may be inserted into connector receptacle 165. A second connector insert 150 may also be inserted into desktop computer 110, for example at connector receptacle 170. Connector insert 150 may be partially surrounded by connector insert housing 155, and attached to cable 157. Cable 157 may in turn be connected to another connector insert, which may in turn be connected to another device, such as a storage device, media player, or other electronic device (not shown).

While in this example a computer system 100 including desktop computer 110 is improved by the incorporation of one or more embodiments of the present invention, other electronic devices, such as tablet, laptop, netbook, and all-in-one computers, cell, smart, and media phones, storage devices, portable media players, navigation systems, monitors, and others may be improved the incorporation of one or more embodiments of the present invention.

Connector receptacles, such as connector receptacles 165 and 170, may receive and provide signals in compliance with various standards or interfaces, such as USB, HDMI, DVI, DisplayPort, thunderbolt, or other interface. To support a large number of standards or interfaces, a correspondingly large number of connector receptacles currently need to be included in desktop computer 110. These connectors may add expense, complexity, and size to desktop computer 110. This large number of conductors also degrades the aesthetics of desktop computer 110 or other electronic device, and adds to customer confusion and dissatisfaction.

Accordingly, embodiments of the present invention provide connector receptacles that are capable of accepting a variety of connector inserts that support a variety of interfaces and standards. In a specific embodiment of the present invention, a connector receptacle includes a number of relatively small contacts or pads. These contacts may be arranged on a bottom of a connector receptacle, a top of a connector receptacle, or both a bottom and top of a connector receptacle. In other embodiments of the present invention, contacts or pads may also be included along sides of a connector receptacle. In still other embodiments of the present invention, receivers and transmitters for fiber-optic signals may be included in the connector receptacle. When a connector insert is inserted into the connector receptacle, various ones of the receptacle pads may be shorted by pads or contacts on the connector insert. By identifying which receptacle pads are connected to each other, the locations of connector insert pads may be determined. When each type of connector insert has a unique pattern, the identity of a type of connector insert may be learned using the insert pad locations. Once the type of connector insert is identified, contacts or pads in a connector receptacle may be configured to provide or receive power or other signals. An example of the operation of such a connector receptacle is outlined in the following figure.

Figure 2:
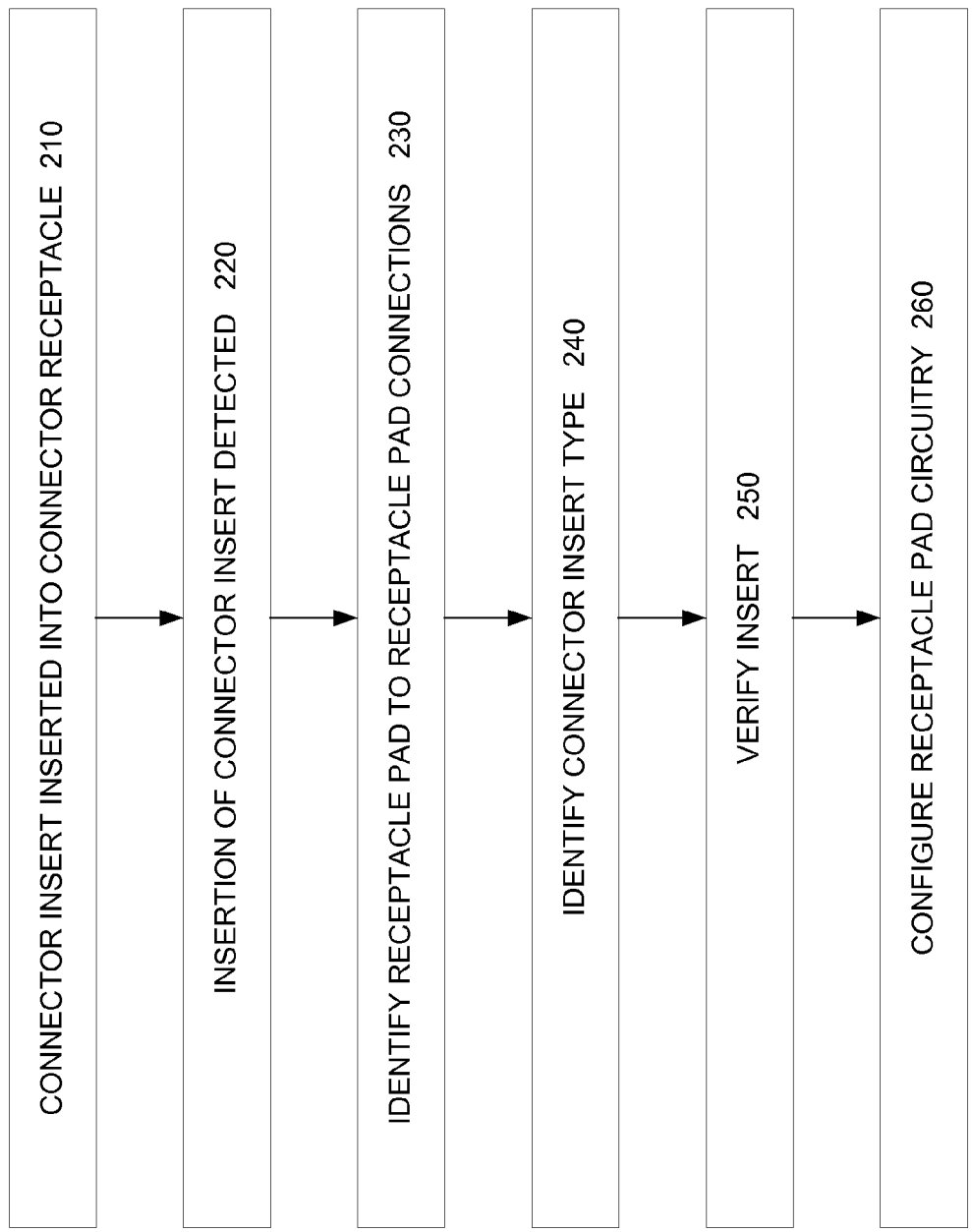
FIG. 2 illustrates a method of forming a connection between a connector receptacle and connector insert according to an embodiment of the present invention.

FIG. 2 illustrates a method of forming a connection between a connector receptacle and connector insert according to an embodiment of the present invention. This figure, as with the other included figures, is shown for illustrative purposes and does not limit either the possible embodiments of the present invention or the claims.

In act 210, a connector insert is inserted into a connector receptacle. In various embodiments of the present invention, the connector insert may be registered in the connector receptacle, that is, the connector insert may be formed to fit into the connector receptacle without substantial movement. In other embodiments of the present invention, the connector insert may not be registered in a connector receptacle, that is, the connector insert may be formed such that it is free to move inside the connector receptacle after insertion.

In act 220, the insertion is detected by the receptacle. In various embodiments of the present invention, this detection may be determined in a number of ways. For example, the connector receptacle may include a door or cover. This door or cover may be pushed out of the way when a connector insert is inserted, thereby triggering detection of the insertion. In other embodiments of the present invention, a mechanical contact may be deflected when a connector insert is inserted. In still other embodiments of the present invention, the presence of a connector insert may be detected when two or more receptacle pads are connected to each other through a pad on the insert.

In act 230, the receptacle identifies which receptacle pads are connected together through connector insert pads. This may be done in several ways, including the illustrative methods as outlined below.

In act 240, the connections among receptacle pads made by insert pads are used to identify a connector insert type. This identification may be made in several ways, including illustrative methods as outlined below. The identification may determine that the connector insert supports a USB, HDMI, DVI, power, Ethernet, DisplayPort, Thunderbolt, or other type of interface. Additionally, as other interfaces are developed in the future, firmware updates may be provided to allow connector receptacle support.

Once an insert type is identified, the insert may be verified in act 250. Various embodiments of the present invention may perform this function in various ways. For example, a hand shaking or other authentication, identification, or validation method may be used.

Once an insert is verified, circuitry associated with receptacle pads may be configured in act 260. An example of this circuitry is also shown below.

In other embodiments of the present invention, these acts may be performed in various orders or sequences. For example, the connector insert type may be identified before receptacle pad connections are identified. In these embodiments, the identification is used to locate the connector insert pads. An example is shown in the following figure.

Figure 3:
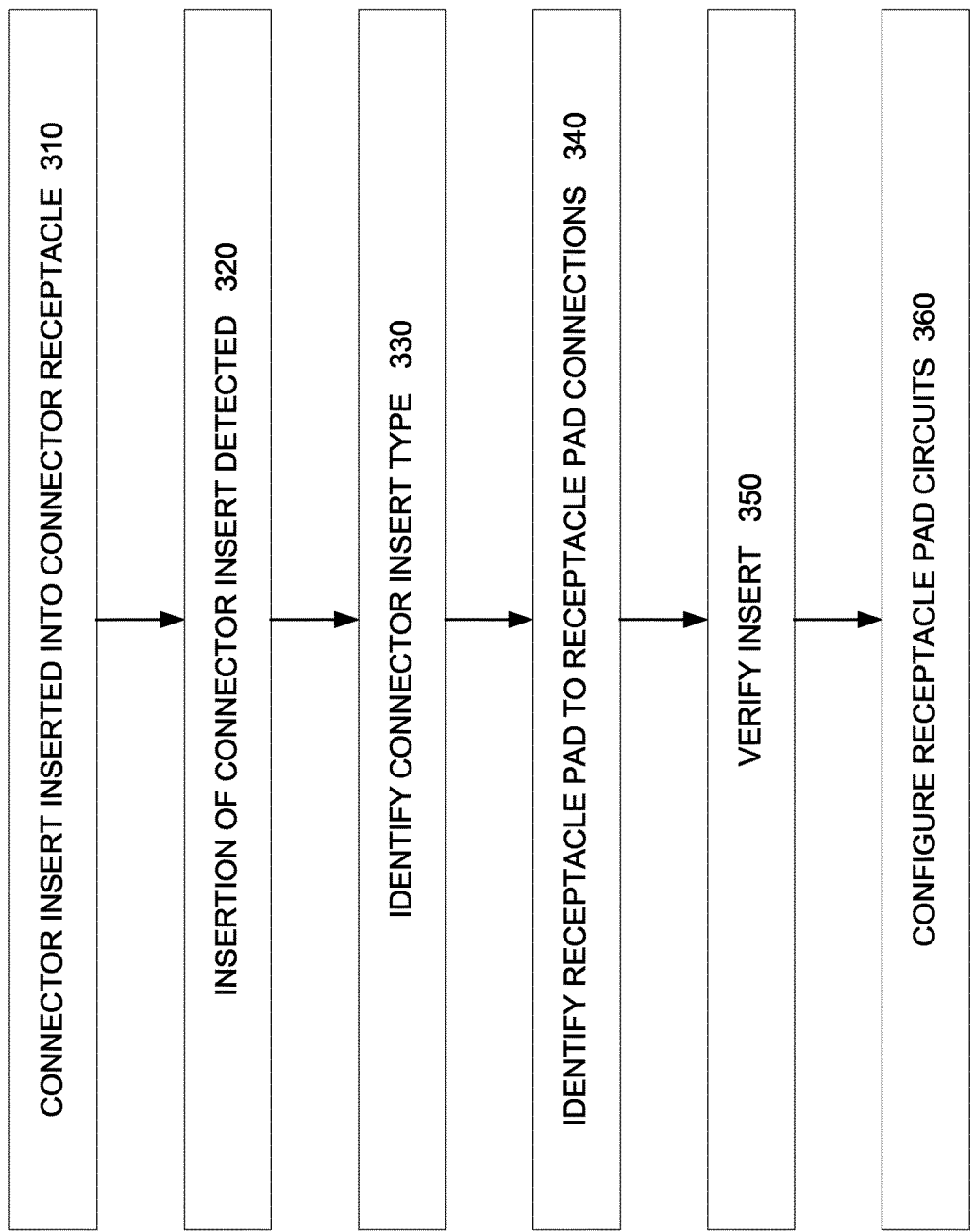
FIG. 3 illustrates another method of forming a connection between a connector receptacle and a connector insert according to an embodiment of the present invention.

FIG. 3 illustrates another method of forming a connection between a connector receptacle and a connector insert according to an embodiment of the present invention. In act 310, a connector insert may be inserted into a connector receptacle. As before, in act 320, the insertion of the connector insert is detected by the receptacle. In act 330, the connector insert type is identified. In act 340, the location of the connector insert pads are determined. In act 350, the connector insert type may be verified. Receptacle pad circuits may be configured in act 360.

Again, receptacle circuitry may identify which receptacle pads or contacts are connected to each other through connector insert pads in various ways. Examples are shown in the following figures.

Figure 4:
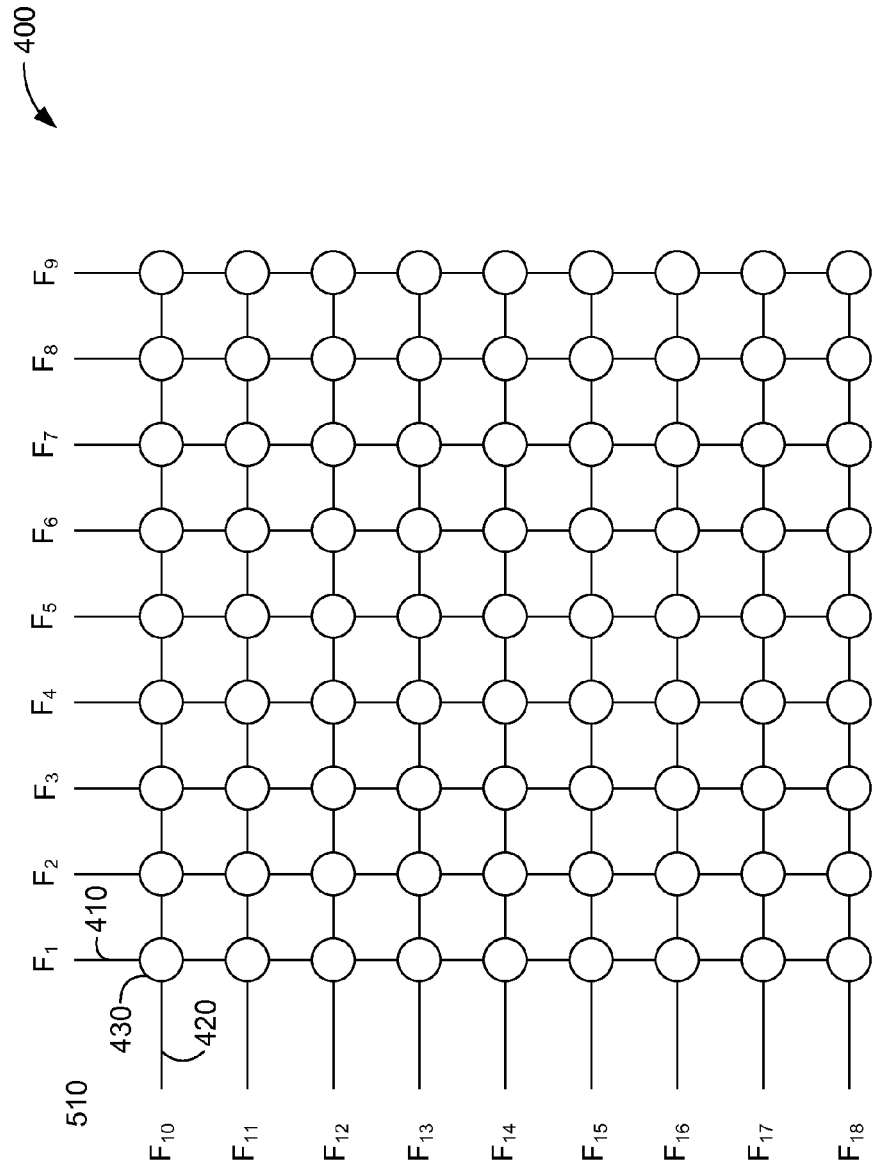
FIG. 4 illustrates an array of receptacle pads according to embodiment of the present invention.

FIG. 4 illustrates an array 400 of receptacle pads 430 according to embodiment of the present invention. Receptacle pads 430 may be joined by vertical lines 410 and horizontal lines 420. In a specific embodiment of the present invention, low amplitude signals at various frequencies may be applied to vertical lines 410 and horizontal lines 420. In this way, each connector receptacle pad or contact 430 may receive two signals having different frequencies. For example, if a signal having frequency F1 is applied to vertical line 410 and a signal having frequency F10 is applied to horizontal line 420, pad 430 may receive a signal having components at frequency F1 and frequency F10.

In various embodiments of the present invention, the frequencies may be allocated in various ways. For example, in some embodiments of the present invention, harmonics are avoided and not used. In other embodiments of the present invention, horizontal lines may have signals having frequencies in a first range, while vertical lines may have signals having frequencies and a second range. In still other embodiments of the present invention, these frequency ranges may overlap at least partially.

In some embodiments of the present invention, each line may receive a signal having a unique frequency. In still other embodiments of the present invention, lines near each other may have unique frequencies, while lines that are far enough apart such that their pads cannot be shorted by a connector insert pad may share a frequency.

While round pads or contacts are shown in this and the other included examples, pads or contacts in either or both a connector insert or connector receptacle may have other shapes and they may be arranged in other patterns. For example, the pads or contacts may be square, rectangular, oblong, or have other shapes.

Various connector inserts may be used according to embodiments of the present invention. In a specific embodiment of the present invention, a connector insert may have rounded edges such that the connector insert may be extracted from a connector receptacle by a non-axial force. In other embodiments of the present invention, the connector insert may have other shapes. The connector insert may have pads on one or both of a top and bottom surface. In other embodiments of the present invention, a connector insert may have one or more pads along its sides. In still other embodiments of the present invention, one or more fiber-optic cables may be included in the connector insert. An example of a connector insert according to an embodiment of the present invention is shown in the following figure.

Figure 5:
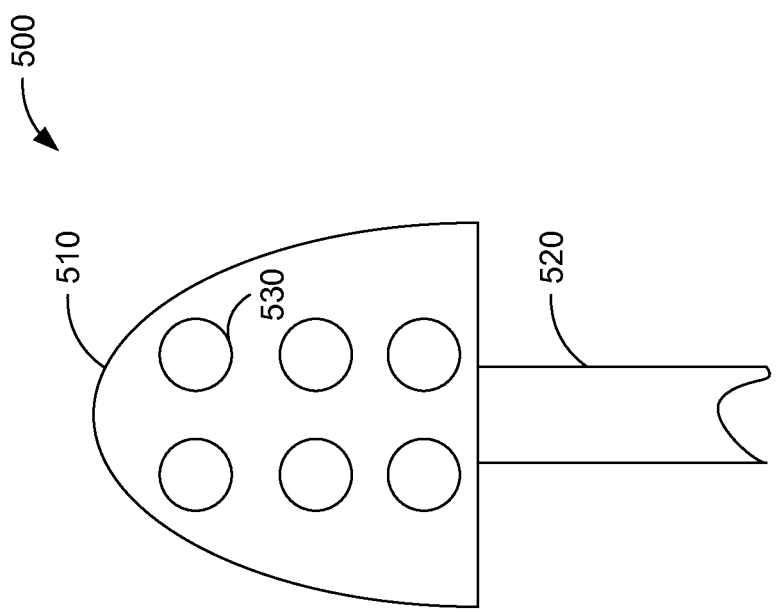
FIG. 5 illustrates a connector insert according to an embodiment of the present invention.

FIG. 5 illustrates a connector insert 500 according to an embodiment of the present invention. Connector insert 500 includes a portion to be inserted 510, and a number of pads or contacts 530 that are connected to conductors (not shown) inside cable 520. Again, in various embodiments of the present invention, connector insert 500 may fit, that is be registered, in a connector receptacle, while in other embodiments of the present invention, connector insert 500 is not registered when it is inserted into a connector receptacle.

Again, connector insert 500 may have a rounded shape such that it may be extracted from a connector receptacle using a non-axial force, that is, it may be non-binding. In still other embodiments of the present invention, connector insert 500 may have other shapes. Also, connector insert 500 may include other features, such as a connector housing or other structure that may be manipulated by a user during insertion. In various embodiments of the present invention, the connector insert may be inserted in either of two orientations, such as right-side-up or up-side-down, and be correctly recognized by the connector receptacle. In various embodiments of the present invention, connector insert 500 and corresponding receptacle may include a self-wiping feature.

In various embodiments of the present invention, connector insert 500 may be attached to a cable. In other embodiments of the present invention, connector insert 500 may be an adapter that provides a conversion from connector insert 500 to a conventional USB, HDMI, DVI, power, Ethernet, DisplayPort, Thunderbolt, or other type of connector.

When connector insert 500 is inserted into a connector receptacle, contacts or pads on the connector insert may connect various connector receptacle pads together. An example is shown in the following figure.

Figure 6:
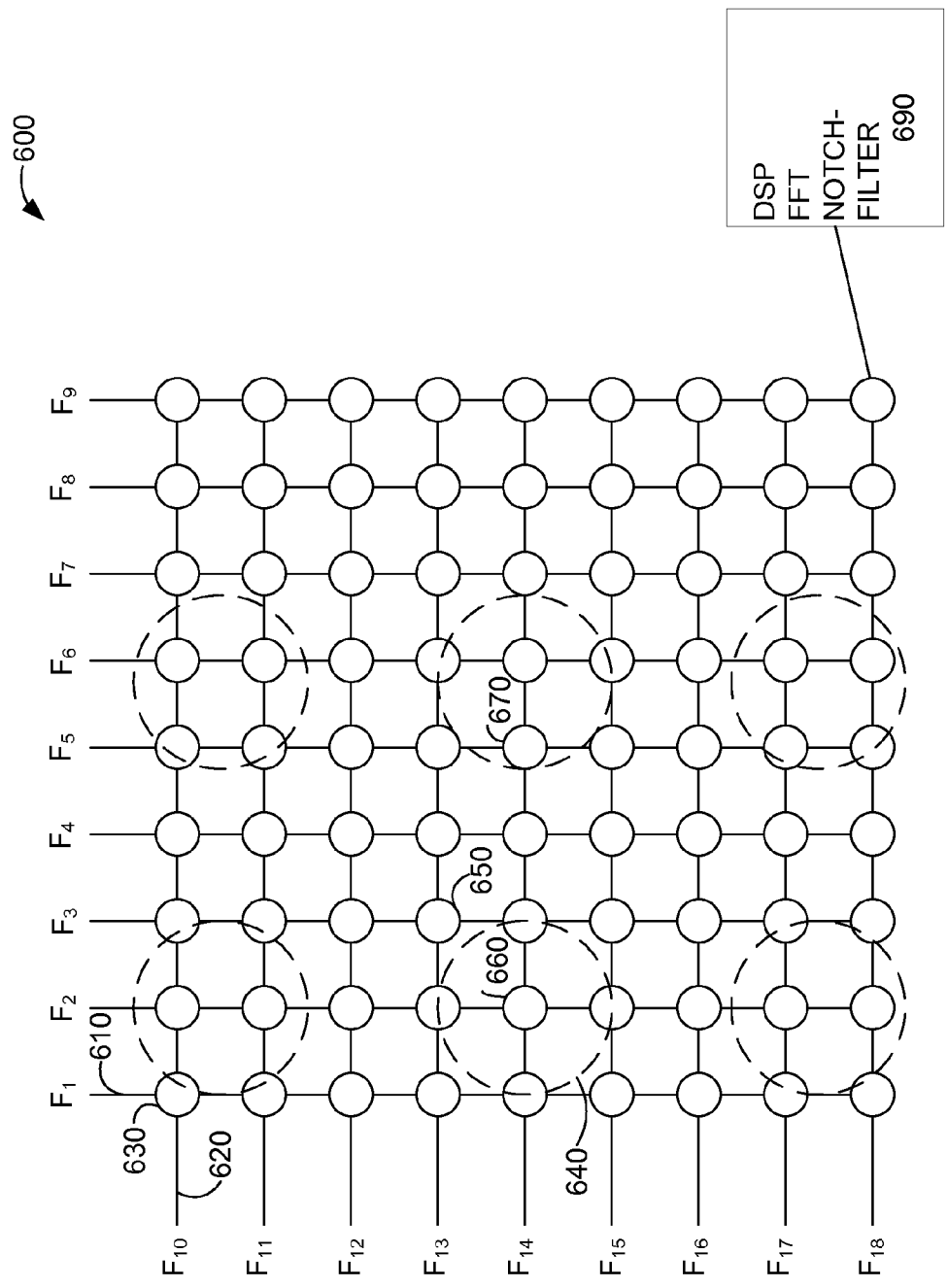
FIG. 6 illustrates the connections formed between connector receptacle pads when a connector insert is inserted into a connector receptacle according to an embodiment of the present invention.

FIG. 6 illustrates the connections formed between connector receptacle pads when a connector insert is inserted into a connector receptacle according to an embodiment of the present invention. In this example, a number of connector insert pads or contacts 640 each form electrical contact with a number of connector receptacle pads or contacts 630.

As before, each vertical line 610 may receive a signal having a first specific frequency, and each horizontal line 620 may receive a signal having a second specific frequency. In this way, each connector receptacle pad 630 receives signals at two specific frequencies. When two such receptacle pads are connected together by a connector insert pad, each such receptacle pad will receive more than two such signals. The identity of these signals may then be used to determine which connector receptacle pads are connected to each other through connector insert pads.

As an example, connector receptacle pad 660 and its horizontal and vertical neighbors may be connected together through connector insert pad 640. This may be determined by reading a signal on connector receptacle pad 660. Specifically, this signal may include frequency compliments at frequencies F1, F2, F3, F13, F14, and F15. This information may be used to determine that each of the horizontal and vertical neighbors of connector receptacle pad 660 are connected or shorted to connector receptacle pad 660 through connector insert pad 640. In various embodiments of the present invention, this information may be determined in various ways. For example, the signals on the receptacle pads may be processed by signal processing circuitry, such as representative signal processing circuit 690, which may comprise a digital signal processor, fast-Fourier transform circuit, notch filters, or other appropriate circuitry.

It should also be noted that receptacle circuitry may mistakenly determine that pad 650 is an electrical contact with pad 660 as well. Specifically, this may occur since the signals on pad 650, F3 and F13, appear on pad 660. In various embodiments of the present invention, this may be handled in one of a number of ways. In one embodiment of the present invention, this is ignored, and pad 650 is treated as though it is actually connected to pad 660. In such an embodiment, if the spacing between connector insert pads is sufficient, connector receptacle pad 650 cannot be connected to another connector insert pad, and therefore treating it as though it is connected to connector insert pad 640 cause no harm. In still other embodiments of the present invention, signals on pad 650 are analyzed. Since connector receptacle pad 650 only includes frequency compliments F3 and F13, it can be determined that connector receptacle pad 650 is not electrically connected to receptacle pad 660 through insert pad 640.

In various embodiments of the present invention, the signals on pads 630 may be read in various ways. For example, signals on the pads may be read one at a time. In other embodiments of the present invention, some or all of these signals on the various pads 630 may be read in parallel.

When signals on pads 630 are read one at a time, various methods may be used to accelerate the process of determining connections among pads 630. For example, the identity of a group of pads connected together may be used to skip one or more readings of connector receptacle pad signals. For example, once it is determined that pad 660 is connected to its horizontal and vertical neighbors, one or more pads may be skipped, whereupon the signals on pad 670 are read next. This reduces the amount of data needed to determine the connector insert configuration and to speed the reading process.

An example of a method of determining which receptacle pads are connected together through insert pads is shown in the following figure. Again, this information may be used to identify the locations of connector insert pads, and therefore a type of connector insert.

Figure 7:
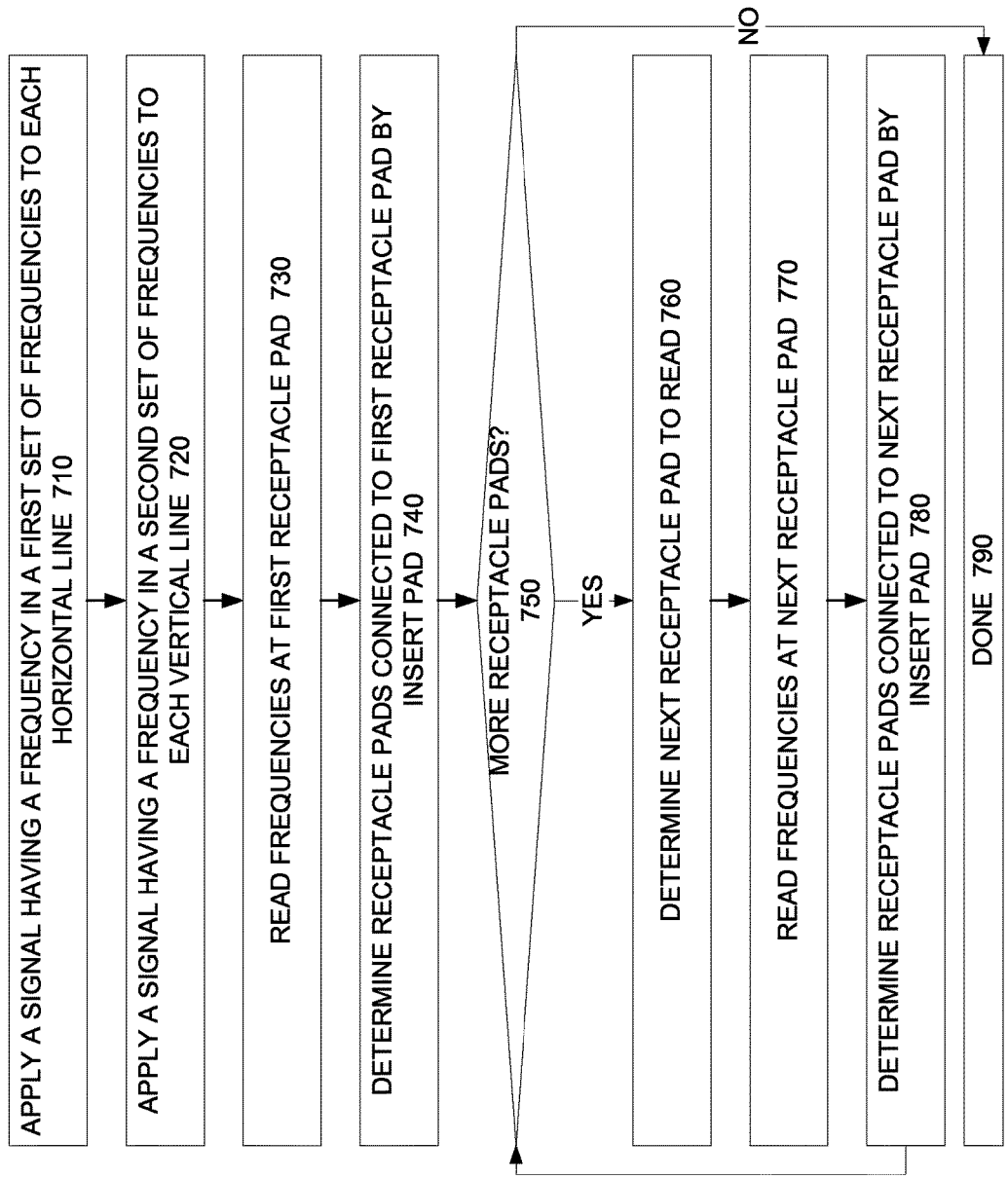
FIG. 7 illustrates a method of determining locations of connector insert pads according to an embodiment of the present invention.

FIG. 7 illustrates a method of determining locations of connector insert pads according to an embodiment of the present invention. In act 710, a signal having one of a first set of frequencies is applied to each horizontal line. In act 720, a signal having one of a second set of frequencies is applied to each vertical line. In act 730, frequencies present on a first receptacle pad are read. In act 740, it may be determined which receptacle pads are connected to the first receptacle pad through an insert pad. In act 750, it is determined whether there are more receptacle pads to read. If so, a next receptacle pad to be read is determined in act 760. Again, in some embodiments of the present invention, some intelligence can be used to try to skip over some receptacle pads, as described above. In act 770, frequencies are read at the next receptacle pad. In act 770, it is determined which receptacle pads are connected to the next receptacle pad through an insert pad. When all receptacle pads have been checked in act 750, the process is done in act 790.

Again, in various embodiments of the present invention, a connector insert may move relative to a receptacle. Accordingly, this process may be restarted or updated on a periodic basis, such that proper connection may be maintained even after a connector insert has moved.

In other embodiments of the present invention, other techniques of determining connections among receptacle pads may be determined. For example, signals may be applied to a subset of connector receptacle pads. For example, a signal may be applied to connector receptacle pads one at a time. An example is shown in the following figure.

Figure 8:
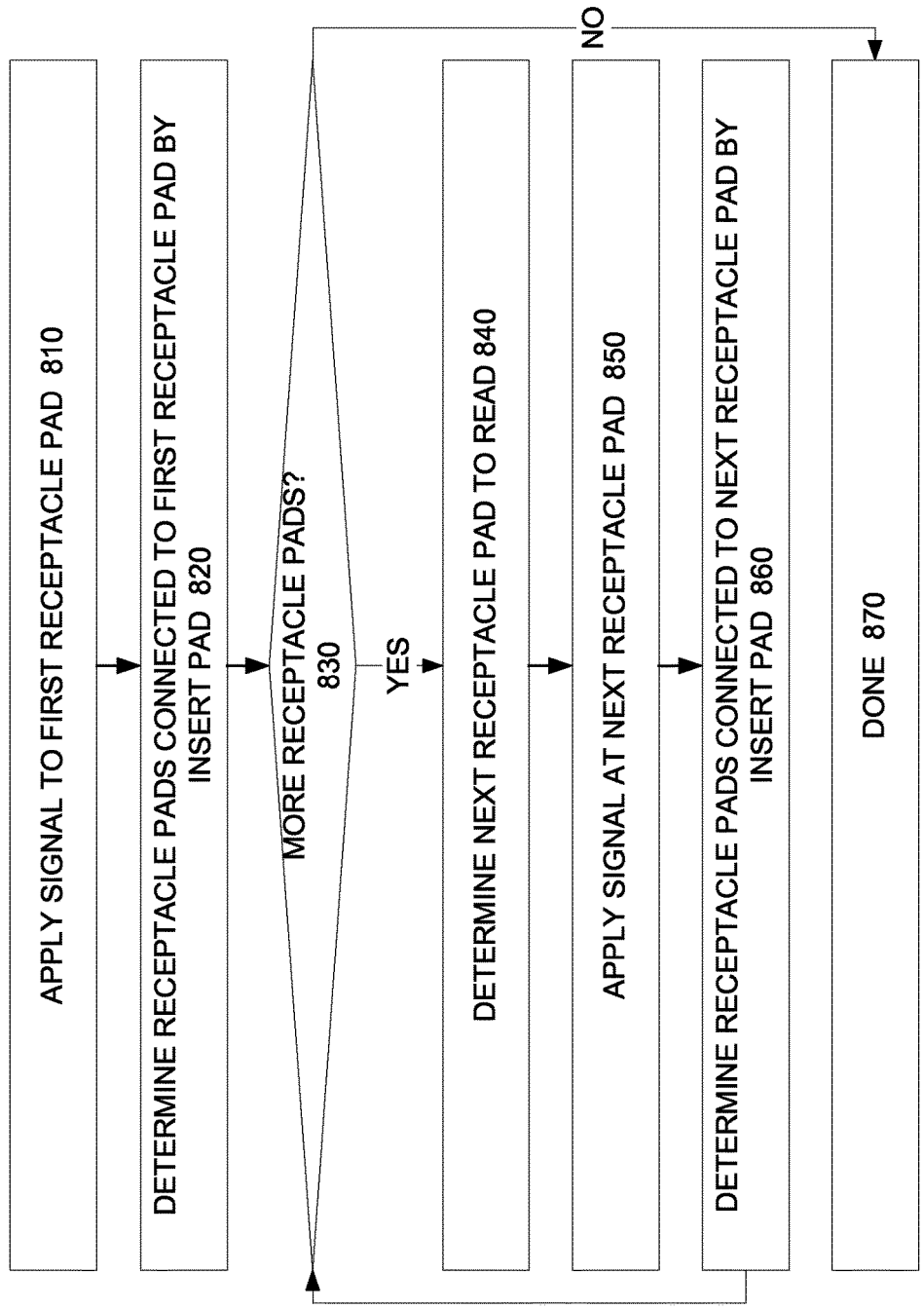
FIG. 8 illustrates another method of determining locations of connector insert pads according to an embodiment of the present invention.

FIG. 8 illustrates another method of determining locations of connector insert pads according to an embodiment of the present invention. A signal is applied to a first receptacle pad in act 810. In act 820, it is determined which receptacle pads are connected to the first receptacle pad by an insert pad. This may be done by determining which receptacle pads also receive the signal. In act 830, it is determined whether or more receptacle pads remain to be checked. If so, the next receptacle pad to be checked is determined in act 840. Again, some intelligence may be used to skip over one or more pads before this next reading is taken. In act 850, a signal may be applied at the next receptacle pad. Again, it may be determined which receptacle pads are connected to the next receptacle pad through an insert pad in act 860. When there are no more receptacle pads to be checked, the process is done in act 870. Again, this process may be restarted at various times.

Connector inserts that support various standards or interfaces may each have a unique contact pattern. In this way, the contact pattern determined above may be used to identify the connector insert and the standard or interface that is supported. In various embodiments of the present invention, the location of each contact on a connector insert is determined, then the connector insert is identified. In other embodiments of the present invention, one or more identifying features are determined and used to identify a connector insert. From this identification, the location of each contact on a connector insert may be determined. Examples are shown in the following figures.

Figure 9:
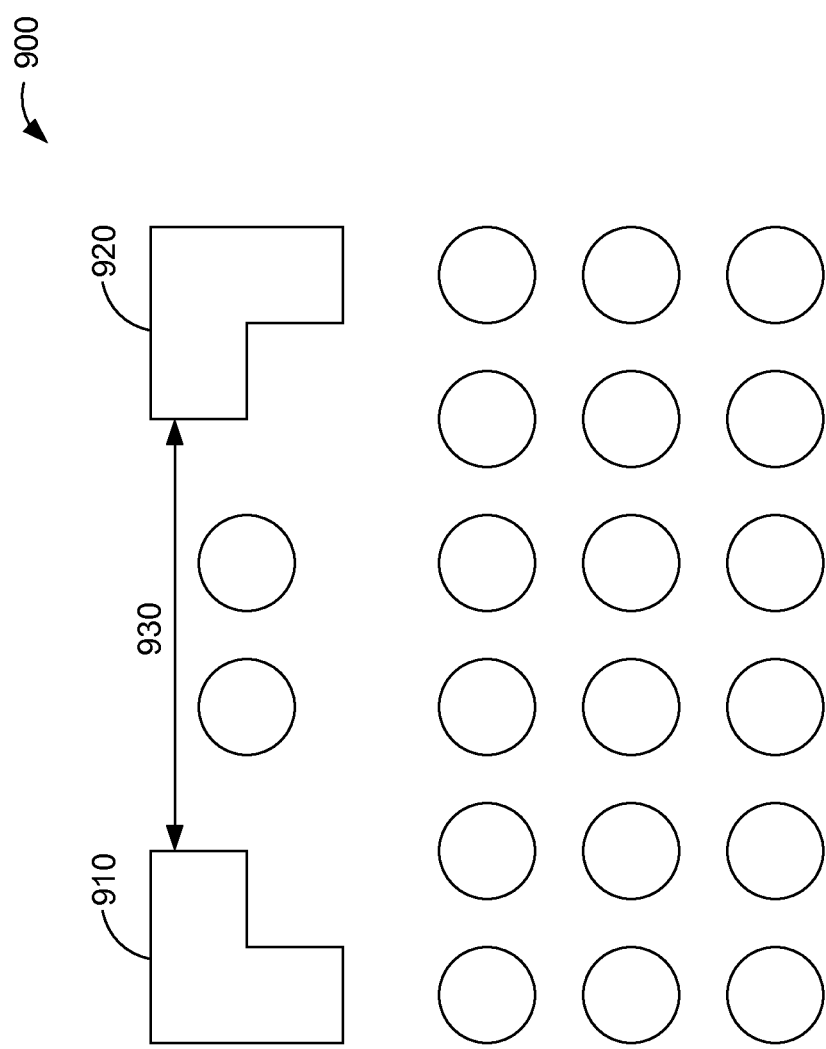
FIG. 9 illustrates a contact or pad pattern for a connector insert according to an embodiment of the present invention.

FIG. 9 illustrates a contact or pad pattern for a connector insert according to an embodiment of the present invention. Connector insert contact pattern 900 may include one or more features 910 and 920. These features may have various shapes, and may be unique and thereby identify the type of connector insert. These features may also be separated by a specific distance 930, which may be used to indentify a type of connector insert. In still other embodiments of the present invention, other features may be used to identify the type of connector.

In another embodiment of the present invention, instead of determining the location of each pad or contact on a connector insert, the locations of only a subset of the pads or contacts on a connector insert are determined. An example is shown in the following figure.

Figure 10:
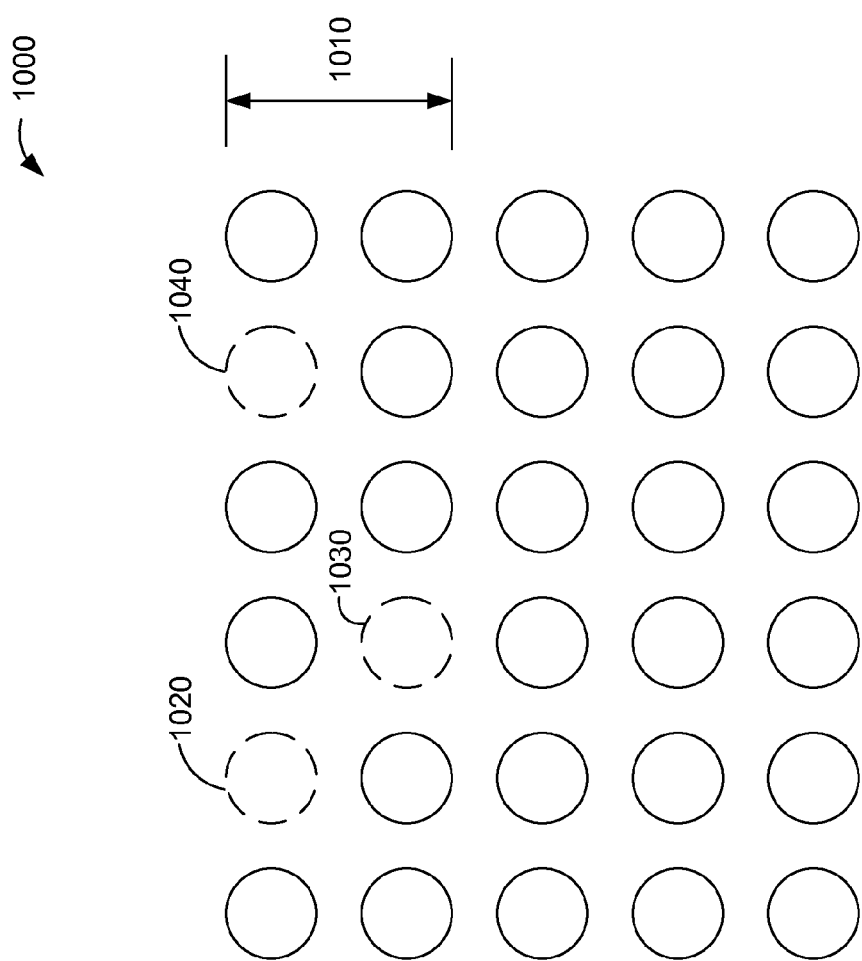
FIG. 10 illustrates another pattern of pads or contacts on a connector insert according to an embodiment of the present invention.

FIG. 10 illustrates another pattern of pads or contacts on a connector insert according to an embodiment of the present invention. In this example, the locations of pads or contacts in range 1010 are identified. Once the locations of these pads are known, the locations of the remaining pads are contacts may be extrapolated. The identity of the type of connector may be determined by detecting the absence of one or more pads or contacts. In this example, pads or contacts 1020, 1030, and 1040 have been removed from zone 1010. The absence of pads or contacts 1020, 1030, and 1040 may be used to identify a specific connector type.

Once the specific connector type is identified, the connector insert may be verified. This may be done using and shaking, authentication, verification, or other methods. Verification is particularly useful in avoiding a situation where a noncompliant connector insert is inserted into a connector receptacle. If a noncompliant connector insert is inserted into connector receptacle and is mistakenly recognized as a valid connector insert, damage to the connector insert may result.

Once verified (if verification is desired), circuitry associated with the connector receptacle pads may be configured. An example of such circuitry is shown in the following figure.

Figure 11:
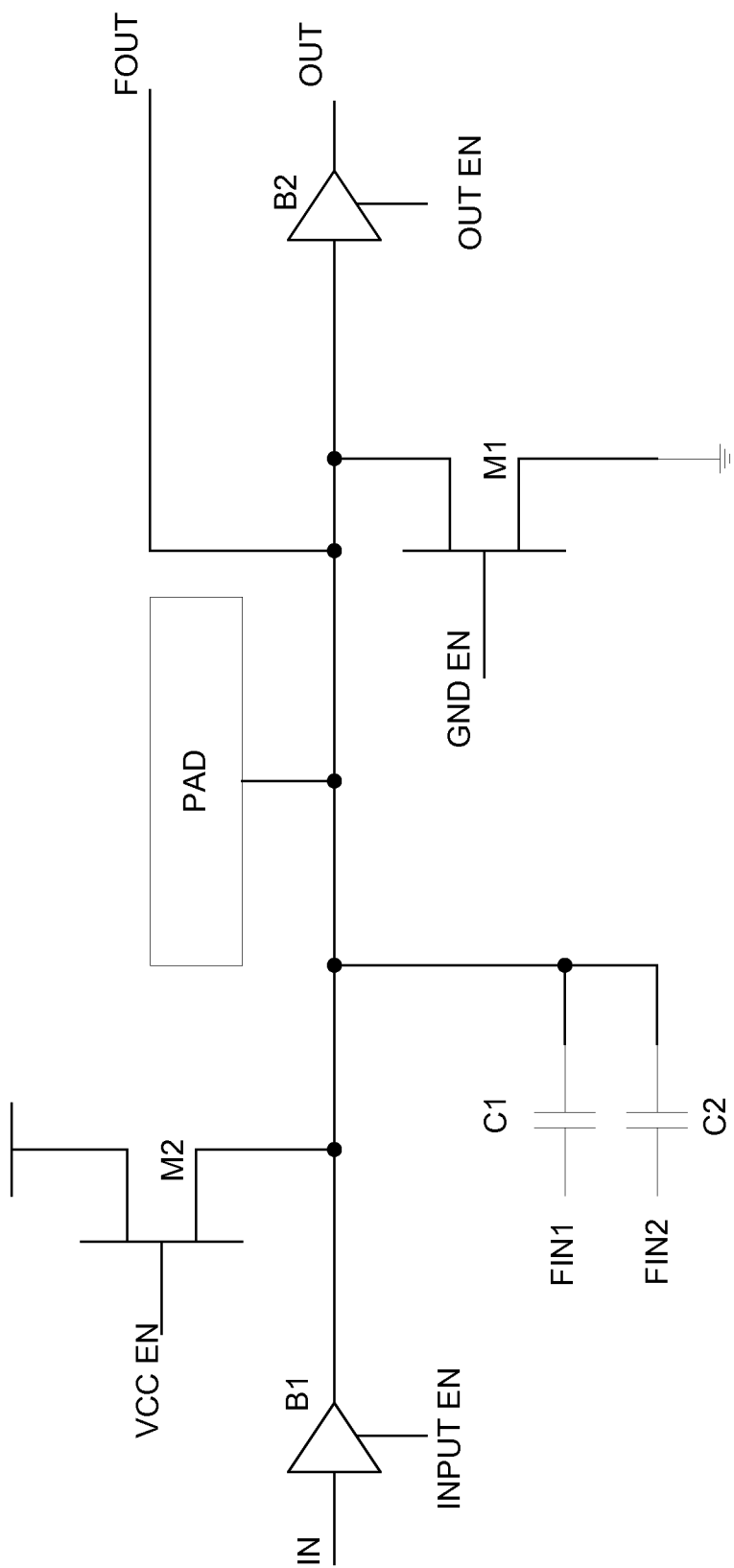
FIG. 11 illustrates circuitry associated with a connector receptacle pad according to an embodiment of the present invention.

FIG. 11 illustrates circuitry associated with a connector receptacle pad according to an embodiment of the present invention. In this example, the pads may be tied to VCC, ground, or to a signal line. Specifically, transistor M2 may be enabled, thereby pulling the pad up to VCC. Alternately, transistor M1 may be enabled, thereby grounding the pad. In this way, power may be supplied or received from a pad on a connector insert. In other configurations, buffer B1 may be enabled, thereby allowing an input signal to be output onto the pad. In still other configurations, buffer B2 may be enabled, thereby allowing ended signals received on the pad to be provided as an output. In still other embodiments of the present invention, buffers B1 and B2 may be replaced by a bidirectional tristate or pass gate.

Again, each pad may receive signals at two frequencies, shown here as signals FIN1 and FIN2. These signals may be AC coupled to the pad such that the pad's DC level is not disturbed during operation. Signals on the pad may be read on line FOUT.

Pads on a connector insert may be formed in various ways. For example, they may be printed or metallic pads for durability. Pads in the connector receptacle may be under a spring tension such that contact is maintained between receptacle pads and insert pads. An example of a portion of a connector receptacle pad is shown in the following figure.

Figure 12:
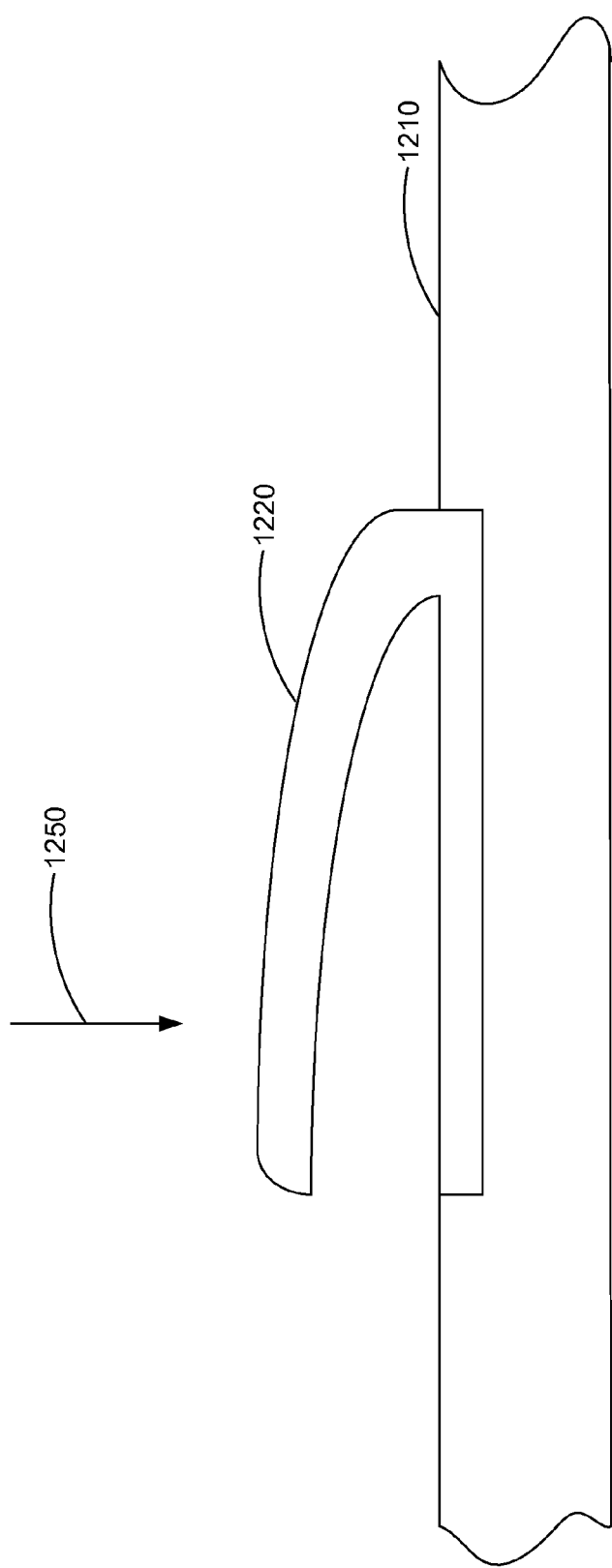
FIG. 12 illustrates a portion of a connector receptacle pad according to an embodiment of the present invention.

FIG. 12 illustrates a portion of a connector receptacle pad according to an embodiment of the present invention. The connector receptacle pad may include one or more spring portions 1220 located on a substrate 1210. When a connector insert is inserted, force in direction 1250 compresses spring portion 1220, thereby ensuring that electrical contact is maintained between the connector receptacle pad and a connector insert pad.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of identifying a connector insert using a connector receptacle, the connector insert comprising a plurality of insert pads and the connector receptacle comprising a plurality of connector receptacle pads, the method comprising:

identifying a plurality of connections among a plurality of connector receptacle pads, where for each connection in the plurality of connections at least two of the plurality of connector receptacle pads are electrically connected to each other by each physically contacting a corresponding one of the plurality of connector insert pads;

identifying a type of connector insert based at least in part on the identification of the plurality of connections among the plurality of connector receptacle pads; and configuring circuitry coupled to the plurality of connector receptacle pads based at least in part on the identification of a type of connector insert, wherein identifying connections among a plurality of connector receptacle pads comprises:

providing a first signal at a first frequency and a second signal at a second frequency to a first connector receptacle pad in the plurality of connector receptacle pads; and reading a signal at a second connector receptacle pad in the plurality of connector receptacle pads, wherein a connection between the first connector receptacle pad and the second connector receptacle pad is identified by the presence of the first frequency and the second frequency in the signal at the second connector receptacle pad.

2. The method of claim 1 further comprising:
detecting an insertion of the connector insert.

3. The method of claim 2 wherein the detecting is an insertion of the connector insert done by identifying a connection between at least two connector receptacle pads in the plurality of connector receptacle pads.

4. The method of claim 1 further comprising:
verifying the type of connector insert.

5. The method of claim 4 wherein the verifying is done using a hand-shaking routine.

6. The method of claim 1 wherein identifying a type of connector insert is done by identifying locations of connector insert pads based on the identified connector receptacle pad connections.

7. A method of identifying a connector insert using a connector receptacle, the connector insert comprising a plurality of insert pads and the connector receptacle comprising a plurality of connector receptacle pads, the method comprising:

identifying a plurality of connections among a plurality of connector receptacle pads, where for each connection in the plurality of connections at least two of the plurality of connector receptacle pads are electrically connected to each other by each physically contacting a corresponding one of the plurality of connector insert pads, by:

providing a first signal at a first frequency and a second signal at a second frequency to a first connector receptacle pad in the plurality of connector receptacle pads; and reading a signal at a second connector receptacle pad in the plurality of connector receptacle pads; and identifying a type of connector insert based at least in part on the identification of the plurality of connections among the plurality of receptacle pads, wherein a connection between the first connector receptacle pad and the second connector receptacle pad is identified by the presence of the first frequency and the second frequency in the signal at the second connector receptacle pad.

8. The method of claim 7 further comprising:

identifying locations for a plurality of connector insert pads based on the identified plurality of connections among a plurality of connector receptacle pads.

9. The method of claim 8 further comprising:

identifying the connector insert using the locations for the plurality of connector insert pads.

10. The method of claim 7 further comprising:

detecting an insertion of the connector insert.

11. The method of claim 10 wherein the detecting is done by identifying a connection between at least two connector receptacle pads in the plurality of connector receptacle pads.

12. The method of claim 7 wherein the first signal at the first frequency and the second signal at the second frequency are simultaneously provided to the first connector receptacle pad in the plurality of connector receptacle pads; and a connection between the first connector receptacle pad and the second connector receptacle pad is identified by the simultaneous presence of the first frequency and the second frequency in the signal at the second connector receptacle pad.

13. A method of identifying a connector inset using a connector receptacle, the connector insert comprising a plurality of insert pads and the connector receptacle comprising a plurality of connector receptacle pads, the method comprising:

providing a first signal having a first frequency to a first set of connector receptacle pads in the plurality of connector receptacle pads;

providing a second signal having a second frequency to a second set of connector receptacle pads in the plurality of connector receptacle pads, wherein the first set of connector receptacle pads and the second set of connector receptacle pads have a first connector receptacle pad in common; and determining, using signal processing circuitry, frequency components of signals on a second connector receptacle pad in the first set of connector receptacle pads and a third connector receptacle pad the second set of connector receptacle pads, wherein the first connector receptacle pad, the second connector receptacle pad, and the third connector receptacle pad are different connector receptacle pads, wherein a connection between the second connector receptacle pad and the third connector receptacle pad, is identified by the presence of the first frequency and the second frequency in the signal at the second connector receptacle pad and the presence of the first frequency and the second frequency at the third connector receptacle pad, and where the second connector receptacle pad and the third connector receptacle pad are electrically connected to each other by each physically contacting a connector insert pad.

14. The method of claim 13 wherein the determining using signal processing circuitry comprises using a digital signal processor.

15. The method of claim 13 wherein the signal processing circuitry performs a fast-Fourier transform.

16. The method of claim 13 wherein the signal processing circuit comprises a notch filter.

17. The method of claim 13 further comprising:

determining an identity of a connector insert based on electrical connections among the plurality of connector receptacle pads.

18. The method of claim 13 wherein providing a first signal to a first set of connector receptacle pads comprises providing a first signal to a first set of connector receptacle pads arranged in a line in a first direction and providing a second signal to a second set of connector receptacle pads comprises providing the second signal to a second set of connector receptacle pads arranged in a line in a second direction, the first direction orthogonal to the second direction.

19. The method of claim 13 wherein the first signal having the first frequency is provided to the first set of connector receptacle pads in the plurality of connector receptacle pads and the second signal having the second frequency is provided to the second set of connector receptacle pads in the plurality of connector receptacle pads simultaneously; and the connection between the second connector receptacle pad and the third connector receptacle pad formed by the connector insert pad is identified by the simultaneous presence of the first frequency and the second frequency in the signal at the second connector receptacle pad and the simultaneous presence of the first frequency and the second frequency at the third connector receptacle pad.

* * * * *